(12) United States Patent
Yuan et al.

(10) Patent No.: US 10,348,890 B2
(45) Date of Patent: Jul. 9, 2019

(54) INFORMATION PUSHING METHOD AND APPARATUS, AND TERMINAL AND SERVER

(71) Applicant: TENCENT TECHNOLOGY (SHENZHEN) COMPANY LIMITED, Shenzhen (CN)

(72) Inventors: Cancai Yuan, Shenzhen (CN); Zhigang Wu, Shenzhen (CN); Jiayao Feng, Shenzhen (CN); Zhaowu Lin, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 15/971,791

(22) Filed: May 4, 2018

(65) Prior Publication Data

US 2018/0255173 A1    Sep. 6, 2018

Related U.S. Application Data

(63) Continuation of application No. PCT/CN2017/081932, filed on Apr. 25, 2017.

(30) Foreign Application Priority Data

May 4, 2016    (CN) .......................... 2016 1 0289031

(51) Int. Cl.
*H04M 3/42*    (2006.01)
*H04L 29/06*    (2006.01)
(Continued)

(52) U.S. Cl.
CPC ........ *H04M 3/42042* (2013.01); *H04L 67/26* (2013.01); *H04L 67/42* (2013.01);
(Continued)

(58) Field of Classification Search
CPC . H04M 3/142; H04M 3/42042; H04W 12/06; G06F 3/04847; H04L 67/42
(Continued)

(56) References Cited

U.S. PATENT DOCUMENTS

2004/0196966 A1    10/2004    Bushnell
2015/0304490 A1*   10/2015    Huang .............. H04M 3/42042
                                                      370/259
2016/0352891 A1    12/2016    Niu et al.

FOREIGN PATENT DOCUMENTS

CN    1980289        6/2007
CN    101568197     10/2009
CN    104853325      8/2015

OTHER PUBLICATIONS

International Search Report dated Jul. 24, 2017 in PCT/CN2017/081932 filed Apr. 25, 2017. (With English Translation).

* cited by examiner

*Primary Examiner* — Melur Ramakrishnaiah
(74) *Attorney, Agent, or Firm* — Oblon, McClelland, Maier & Neustadt, L.L.P.

(57) ABSTRACT

An information processing apparatus including processing circuitry is provided. The processing circuitry is configured to perform security authentication on the first terminal when receiving a call setting request of a first terminal. The processing circuitry is configured to obtain personalized information that is set by a first user via the first terminal when the security authentication on the first terminal succeeds. The processing circuitry is further configured to provide the personalized information of the first user to a second terminal for display during a call with the first terminal. Further, the provided personalized information of the first user is displayed on a call interface of the second terminal.

18 Claims, 7 Drawing Sheets

(51) Int. Cl.
*H04W 12/06* (2009.01)
*H04L 29/08* (2006.01)
*G06F 3/0484* (2013.01)

(52) U.S. Cl.
CPC ....... *H04M 3/42153* (2013.01); *H04W 12/06* (2013.01); *G06F 3/04847* (2013.01); *H04M 2203/6081* (2013.01)

(58) Field of Classification Search
USPC ............. 379/142.09, 142.01, 142.03, 142.02
See application file for complete search history.

INFORMATION PUSHING METHOD AND APPARATUS, AND TERMINAL AND SERVER

RELATED APPLICATION

This application is a continuation of International Application No. PCT/CN2017/081932, filed on Apr. 25, 2017, which claims priority to Chinese Patent Application No. 201610289031.2, entitled "INFORMATION PUSHING METHOD AND APPARATUS, AND TERMINAL AND SERVER" filed on May 4, 2016. The entire disclosures of the prior applications are hereby incorporated by reference in their entirety.

FIELD OF THE TECHNOLOGY

The present disclosure relates to the field of Internet technologies.

BACKGROUND OF THE DISCLOSURE

An incoming call show refers to personalized information that is used for reflecting attributes such as an image, a location, a preference, and a habit of a calling user and that can be displayed on a call interface established by a called user and a calling user. In the related technology, an incoming call show is not set by the calling user, but is locally set by the called user. For example, a user A selects a picture from storage space of a mobile phone as an incoming call show of a contact user B in an address book. In this way, when the user B calls the user A, the picture reflecting the incoming call show of the user B is displayed on a call interface of the mobile phone of the user A. An incoming call show is not set by the calling user, so that personalized information of the incoming call show cannot truly reflect the attributes such as the image, preference, and habit of the calling user. In addition, the incoming call show is locally set by the called user, therefore, the called user needs to set one by one for contact users in the address book, leading to low efficiency. An incoming call show function cannot be implemented for an unknown user out of the address book, leading to low practicality.

SUMMARY

Embodiments of the present disclosure include an information processing method and apparatus, a terminal and a server. The present disclosure can implement setting of personalized information reflecting a real image, preference, habit, and/or the like of a user, and can improve the efficiency of setting information and the practicality of processing information.

A first aspect of the embodiments of the present disclosure provides an information processing method. Security authentication is performed on the first terminal by a server when receiving a call setting request of a first terminal. Personalized information that is set by a first user via the first terminal is obtained by the server when the security authentication on the first terminal succeeds. The personalized information of the first user is provided by the server to a second terminal for display during a call with the first terminal. Further, the provided personalized information of the first user is displayed on a call interface of the second terminal.

A second aspect of the embodiments of the present disclosure provides a non-transitory computer-readable storage medium. The non-transitory computer-readable storage medium stores a program executable by a processor of a first terminal to send, when detecting a call setting operation of a first user, a call setting request to a server and responds to a security authentication request from the server. When the security authentication succeeds, personalized information that is set by the first user is sent to the server. The personalized information of the first user is provided by the server to a second terminal for display during a call with the first terminal. Further, the personalized information of the first user is displayed on a call interface of the second terminal.

A third aspect of the embodiments of the present disclosure provides a non-transitory computer-readable storage medium. The non-transitory computer-readable storage medium stores a program executable by a processor of a second terminal to receive personalized information of a first user from a server. The personalized information of the first user is set by the first user via a first terminal and obtained by the server after security authentication on the first terminal succeeds. The personalized information of the first user is displayed on a call interface of the second terminal.

A fourth aspect of the embodiments of the present disclosure provides an information processing apparatus including processing circuitry. The processing circuitry is configured to perform, when receiving a call setting request of a first terminal, security authentication on the first terminal and obtain, when the security authentication on the first terminal succeeds, personalized information that is set by a first user via the first terminal. The processing circuitry is further configured to provide the personalized information of the first user to a second terminal for display during a call with the first terminal. The provided personalized information of the first user is displayed on a call interface of the second terminal.

In the embodiments of the present disclosure, the server performs security authentication on the first terminal according to the call setting request of the first terminal, and this process may ensure the security and reliability of call setting. Further, after the security authentication succeeds, the first user may set personalized information of the first user in the server by using the first terminal. The first user sets the personalized information reflecting an incoming call show, so that the personalized information of the first user may truly reflect an image, preference, habit, and the like of the first user. Furthermore, the server shares the personalized information of the first user with a second terminal establishing a call with the first terminal, so that the second terminal displays the personalized information of the first user on a call interface of the first terminal. Herein, the personalized information of the first user is managed and shared by using the server. This may enable another user to implement a function of an incoming call show without locally setting the incoming call show, thereby improving the efficiency of setting information and the practicality of processing information.

BRIEF DESCRIPTION OF THE DRAWINGS

To describe the technical solutions in the embodiments of the present disclosure or in the related technology more clearly, the following briefly describes the accompanying drawings required for describing the embodiments or the related technology. The accompanying drawings in the following description show merely some embodiments of the present disclosure, and a person of ordinary skill in the art may still derive other accompanying drawings from these accompanying drawings.

DESCRIPTION OF EMBODIMENTS

The following describes the technical solutions in the embodiments of the present disclosure with reference to the accompanying drawings in the embodiments of the present disclosure. The described embodiments are only some embodiments instead of all embodiments of the present disclosure. All other embodiments obtained by a person of ordinary skill in the art based on the embodiments of the present disclosure shall fall within the protection scope of the present disclosure.

Figure 1:
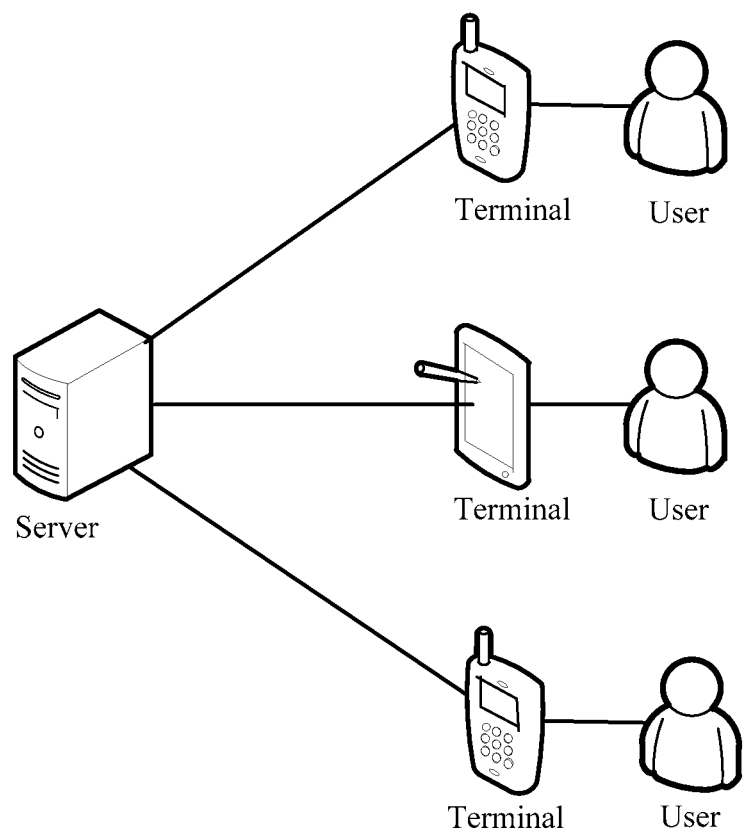
FIG. 1 is a schematic structural diagram of an information processing system according to an embodiment of the present disclosure.

The embodiments of the present disclosure provide an information processing system, such as a message processing system. Referring to FIG. 1, the message processing system may include a server and at least one terminal accessed to the server.

The terminal may be a device such as a personal computer (PC), a notebook computer, a mobile phone, a PAD (a tablet computer), a vehicle terminal, and an intelligent wearable device. The terminal has normal communication functions such as calling, and receiving and sending a short message service message. In addition, at least one type of Internet application program may run in the terminal, which includes, but is not limited to an instant messaging application program, a social networking services (SNS) application program, a security application program, and the like. A user may use the calling function, the short message service message function, or the Internet application program of the terminal. The user herein may include a human user and/or an enterprise user. The server may be an independent service device in the Internet, or a cluster service device formed by multiple independent service devices. It is noted that, a first terminal in certain embodiments of the present disclosure may be any terminal that accesses the server, and a first user is a user using the first terminal (including the human user or the enterprise user). A second terminal in certain embodiments may be any terminal that accesses the server apart from the first terminal, and a second user is a user using the second terminal.

An incoming call show in certain embodiments refers to personalized information that is used for reflecting attributes such as an image, a location, a preference, and/or a habit of a calling user and that can be displayed on a call interface established by a called user and a calling user. The personalized information may include, but is not limited to at least one of a picture, an animation, an audio, and a video. In the embodiments of the present disclosure, if receiving a call setting request of the first terminal, the server performs security authentication on the first terminal, and this process may ensure the security and reliability of call setting (including setting of an incoming call show function). Further, if the security authentication succeeds, the server obtains the personalized information set by the first user by using the first terminal. The first user sets the personalized information reflecting an incoming call show, so that the personalized information of the first user may truly reflect an image, preference, habit, and/or the like of the first user. Furthermore, the server shares the personalized information of the first user with a second terminal establishing a call with the first terminal, so that the second terminal displays the personalized information of the first user on a call interface of the first terminal. Herein, the personalized information of the first user is managed and shared by using the server. This may enable another user to implement a function of an incoming call show without locally setting the incoming call show, thereby improving the efficiency of setting information and the practicality of processing information.

Figure 2:
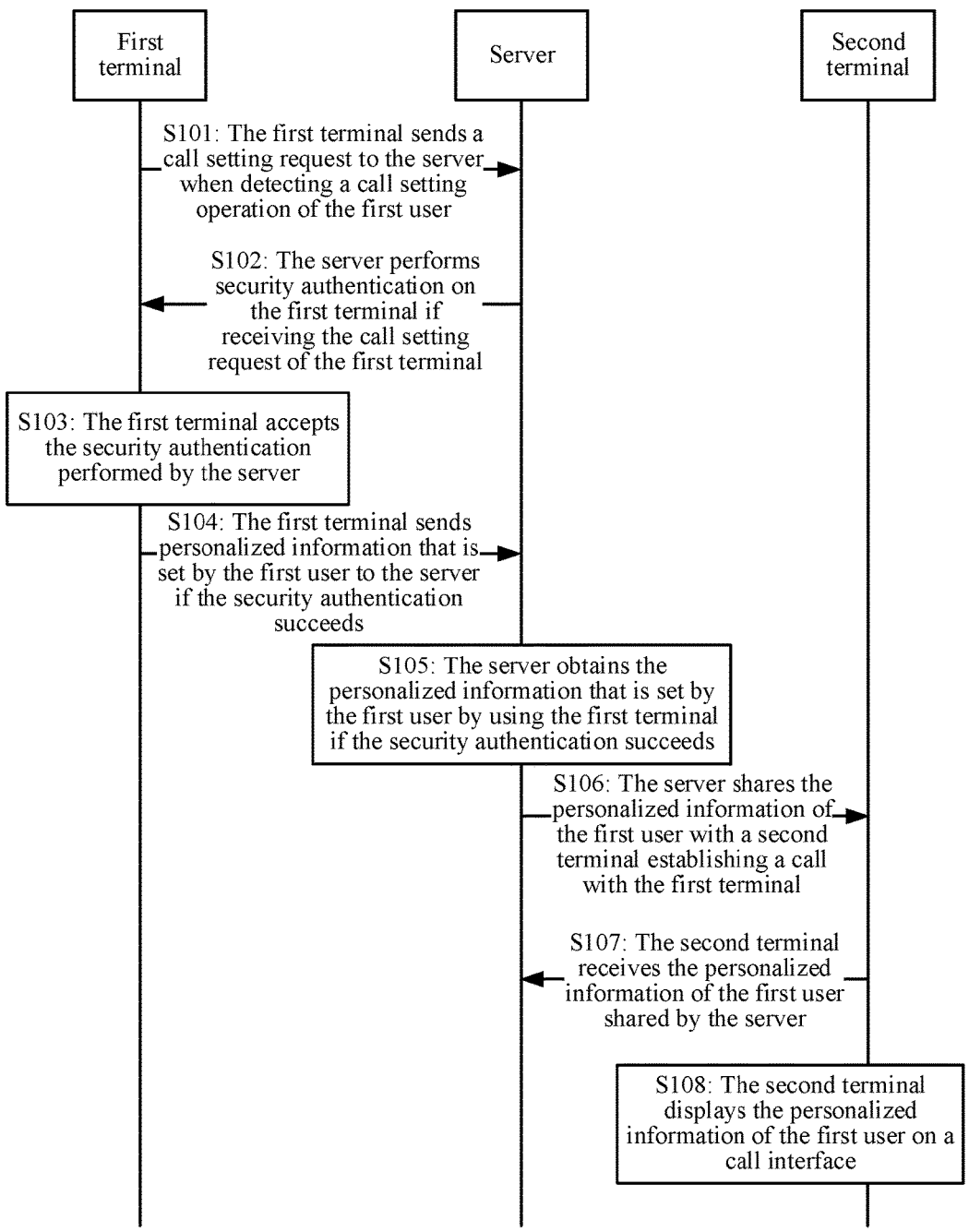
FIG. 2 is a flowchart of an information processing method according to an embodiment of the present disclosure.

Based on the foregoing description, an embodiment of the present disclosure provides an information processing method. The information processing method may be applied to an information processing system shown in FIG. 1. Referring to FIG. 2, the information processing method may include the following steps S101 to S108. Steps S101, S103, and S104 are performed by the first terminal; steps S102, S105, and S106 are performed by the server; and steps S107 and S108 are performed by the second terminal.

In step S101, the first terminal sends a call setting request to the server when detecting a call setting operation of the first user.

During one implementation, a process of performing step S101 by the first terminal includes the following two feasible implementations. In one implementation of step S101, the first terminal sends the call setting request to the server when detecting that the first user selects a call setting function option in an application program of the first terminal.

An application program having a call setting function is installed on and run by the first terminal. The application program may include, but is not limited to an instant messaging application program, a security application program, an SNS application program, and the like. An option or button of call setting is provided on an interaction interface of the application program. When a user selects the call setting option or clicks on the call setting button to perform the call setting operation, the first terminal sends the call setting request to the server. The call setting request herein is used for requesting to set personalized information of an incoming call show for the first user in a call.

In another implementation of step S101, the first terminal sends the call setting request to the server when detecting that the first user opens a call setting page in a browser of the first terminal.

Herein, the call setting page is a page that may configure the personalized information used for incoming call show in a call. The call setting page may be an H5 (HyperText Markup Language 5.0 (HTML 5.0)) page. The first user may obtain a link address of the H5 page by using various manners. For example, the first user may obtain the link address of the H5 page from an official forum or website of a provider of the H5 page; alternatively, the first user may receive the link address of the H5 page shared by another user by using the instant messaging application program and the SNS application program, and the like. When the first user opens the H5 page in the browser of the first terminal according to the link address of the H5 page, the first terminal sends the call setting request to the server.

In step S102, the server performs security authentication on the first terminal if receiving the call setting request of the first terminal.

An objective of the security authentication on the first terminal performed by the server is to ensure that the call setting request is really initiated by the first user (an authorized user) by using the first terminal (an authorized terminal) and to ensure the security and reliability of subsequent call setting related to an incoming call show. During one implementation, the following two implementations exist in a process of performing step S102 by the server. In one implementation, the server performs the following steps of s11 to s13 in the process of performing step S102.

In step S11, the server sends a first security authentication reminder to the first terminal if receiving the call setting request of the first terminal, the first security authentication reminder carrying verification code.

In step S12, the server checks the input character string by using the verification code when receiving a character string that is input by the first user according to the first security authentication reminder and that is returned by the first terminal.

In step S13, the server confirms that the security authentication performed on the first terminal succeeds if the check succeeds.

In steps s11 to s13, when the server receives the call setting request of the first terminal, the server establishes a communication connection with the first terminal and obtains a communication number of the first terminal. In this way, the server may send the first security authentication reminder carrying the verification code to the first terminal based on the communication number of the first terminal. The first terminal may display the verification code on an interaction interface of an application program or a call setting page (that is, an H5 page) to remind the first user to manually input the verification code for checking. Further, the first terminal submits the character string manually input by the first user to the server for checking. If the check succeeds, it indicates that the first user currently uses the first terminal, which indicates that the call setting request is really initiated by the first user by using the first terminal. Therefore, the server confirms that the security authentication performed on the first terminal succeeds. It can be understood that, if the check fails, it may be confirmed that the security authentication performed on the first terminal fails, and consequently, the call setting process may end.

In another implementation, the server performs the following steps of s21 to s23 in the process of performing step S102.

In step S21, the server sends a second security authentication reminder to the first terminal if receiving the call setting request of the first terminal, the second security authentication reminder carrying a particular communication number.

In step S22, the server detects whether verification information sent by the first terminal to the particular communication number is received in a preset time, the verification information being generated by the first terminal according to an information editing operation of the first user.

In step S23, the server confirms that the security authentication performed on the first terminal succeeds if yes.

In steps s21 to s23, when the server receives the call setting request of the first terminal, the server establishes a communication connection with the first terminal and obtains a communication number of the first terminal. In this way, the server may send the second security authentication reminder carrying the particular communication number to the first terminal based on the communication number of the first terminal. The particular communication number herein may be a special number that is used for security authentication and that is set by the server. For example, the particular communication number may be a number of 0000, 0001, and the like. The first terminal may output a verification reminder on an interaction interface of an application program or a call setting page (e.g., an H5 page) to remind the first user to send a verification message to the particular communication number. Further, the first terminal sends the verification information edited by the first user to the particular communication number. If the verification information sent by the first terminal to the particular communication number is detected in the preset time, it indicates that the first user currently uses the first terminal, which indicates that the call setting request is really initiated by the first user by using the first terminal. Therefore, the server confirms that the security authentication performed on the first terminal succeeds. It can be understood that, if the verification information sent by the first terminal to the particular communication number is not detected in the preset time, it may be confirmed that the security authentication performed on the first terminal fails, and consequently, the call setting process may end.

In step S103, the first terminal accepts the security authentication performed by the server.

In step S103, the first terminal needs to cooperate with the server to perform the security authentication, so as to ensure the security and reliability of call setting of an incoming call show. For the process of the security authentication performed by the server by cooperating with the first terminal, refer to related description in step S102, which is not further described herein.

In step S104, the first terminal sends personalized information that is set by the first user to the server if the security authentication succeeds.

After the security authentication succeeds, the first user may configure personalized information used for an incoming call show on an H5 page displayed by a browser of the first terminal; alternatively, an application program of the first terminal may output an interaction interface used for performing personalized information setting. The first user may configure the personalized information used for the incoming call show on the interaction interface of the application program. The first terminal sends the personalized information configured by the first user to the server.

In step S105, the server obtains the personalized information that is set by the first user by using the first terminal if the security authentication succeeds.

During one implementation, the following two implementations may exist in a process of performing step S105 by the server. In one implementation, the server performs the following steps of s31 and s32 in the process of performing step S105.

In step S31, the server sends, if the security authentication succeeds, at least one personalized template to the first terminal for output to be provided to the first user for selection, the personalized template including: at least one of a picture, an animation, an audio, and a video.

In step S32, the server determines a personalized template selected by the first user by using the first terminal as the personalized information of the first user.

In steps s31 and s32, after the security authentication succeeds, the server may send at least one personalized template to the first terminal. The first terminal may display the personalized templates on an interaction interface of an application program, or display the personalized templates on an H5 page. The first user may select one personalized template from the personalized templates to apply to an incoming call show. The first terminal sends the personalized template selected by the first user to the server, and the server determines the selected personalized template as the personalized information of the first user.

In another implementation, the server performs the following steps of s41 and s42 in the process of performing step S105.

In step S41, the server receives customized information uploaded by the first user by using the first terminal if the security authentication succeeds, the customized information including: at least one of a picture, an animation, an audio, and a video.

In step S42, the server determines the customized information as the personalized information of the first user.

In steps s41 and s42, after the security authentication succeeds, the first user may make the customized information used for an incoming call show by selecting from a local picture album of the first terminal, downloading from the Internet, or using a multimedia processing tool. The first terminal uploads the customized information of the first user to the server and the server determines the customized information of the first user as the personalized information of the first user.

By using the foregoing two implementations, the first user may set the personalized information that is applied to an incoming call show by the first user. The personalized information of the first user is stored in the server and is managed by the server in a unified manner.

In step S106, the server shares the personalized information of the first user with a second terminal establishing a call with the first terminal.

The server shares the personalized information of the first user with the second terminal, so that a second user may display the personalized information of the first user in the second terminal without locally performing configuration in the second terminal, so as to implement an incoming call show of the first user.

In step S107, the second terminal receives the personalized information of the first user shared by the server.

During one implementation, a process of performing step S107 by the second terminal includes the following two feasible implementations. In one implementation, step S107 is that the second terminal pulls personalized information of at least one contact user of the second user from the server according to a predetermined frequency, the contact user including the first user.

The contact user of the second user may be a user stored in an address book of the second user, or may be a user having a historical communication record (for example, a historical call record or a historical short message service message record) of the second user. This implementation describes that, before the first user establishes a call with the second user, the second terminal pre-pulls the personalized information of the first user according to the predetermined frequency and stores the personalized information in local storage space. When the first user calls the second user, the second terminal may directly extract the personalized information of the first user from the local storage space to display an incoming call show. The efficiency is high.

In another implementation, step S107 is that the second terminal obtains the personalized information of the first user from the server when the first terminal establishes a call with the second terminal according to a call request for the second user initiated by the first user. In this implementation, when the first user calls the second user, the second terminal extracts the personalized information of the first user from the server in real time. Compared with the previous implementation, this implementation may be limited by a factor such as network bandwidth. Consequently, a longer delay is caused.

In step S108, the second terminal displays the personalized information of the first user on a call interface of the second terminal, so as to display an incoming call show of the first user.

The following describes a process of the information processing method according to this embodiment of the present disclosure in detail by using a specific example. In this example, the first user is a user A, the first terminal is a mobile phone A, the second user is a user B, and the second terminal is a mobile phone B.

Figure 3A:
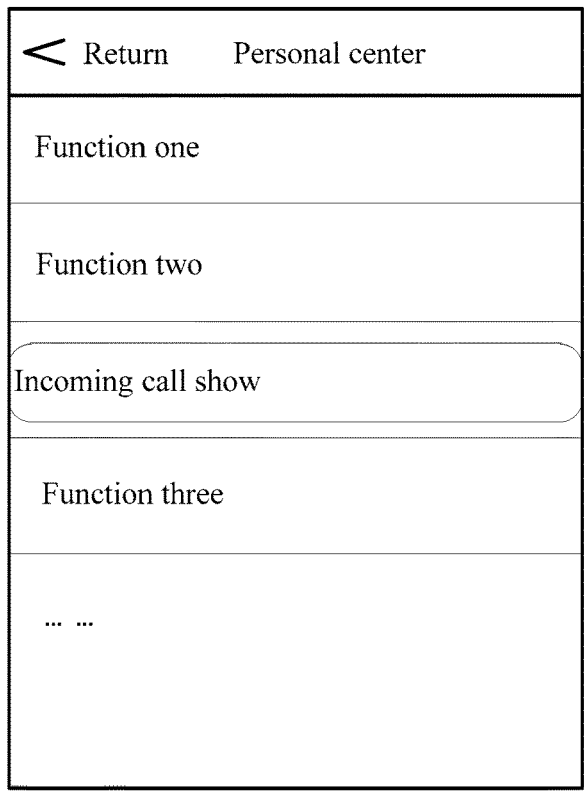
FIG. 3a is a schematic diagram of setting an incoming call show according to an embodiment of the present disclosure.
Figure 3B:
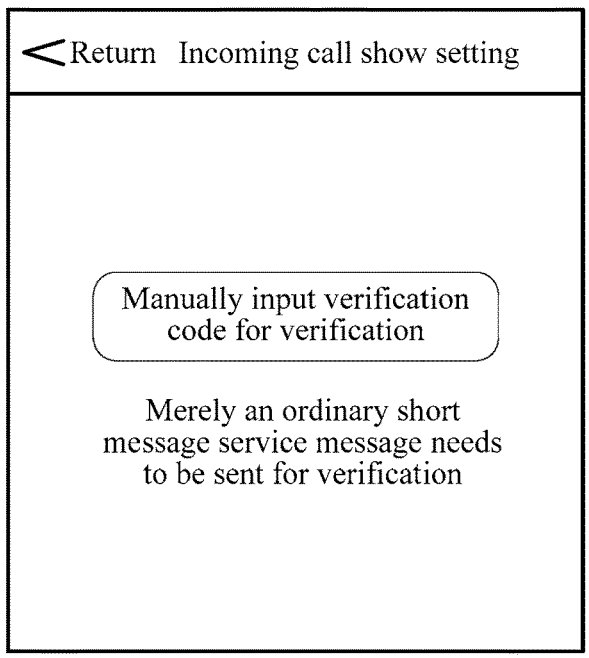
FIG. 3b is another schematic diagram of setting an incoming call show according to an embodiment of the present disclosure.

Referring to FIGS. 3a and 3b together, the user A opens a security application program on the mobile phone A, selects an incoming call show option, and enters an interface shown in FIG. 3b. The user A may select a security authentication manner of incoming call show setting on the interface shown in FIG. 3b, including a manually-input verification code manner or a short message service message verification manner. The mobile phone A sends a call setting request to the server, and the call setting request carries the security authentication manner selected by the user A.

Figure 3C:
FIG. 3c is still another schematic diagram of setting an incoming call show according to an embodiment of the present disclosure.

If the user A selects the manually-input verification code manner, the server returns a first security authentication reminder carrying verification code to the mobile phone A, and the mobile phone A outputs the verification code to remind the first user to manually input the verification code for checking. Referring to FIG. 3c, the user A manually inputs a character string used for verification, and the mobile phone A sends the character string input by the user A to the server. The server checks the character string, and the security authentication succeeds if the check succeeds. If the user A selects the short message service message verification manner, the server sends a second security authentication reminder carrying a particular communication number to the mobile phone A, and the mobile phone A may output a verification reminder to remind the user A to send a short message service message verification message to the particular communication number. Further, the mobile phone A sends the short message service message verification information edited by the first user to the particular communication number. If the verification information sent by the mobile phone to the particular communication number is detected in a preset time, the security authentication succeeds.

Figure 3D:
FIG. 3d is still another schematic diagram of setting an incoming call show according to an embodiment of the present disclosure.

After the security authentication succeeds, the server returns a personalized template to the mobile phone A. Referring to FIG. 3d, the mobile phone A displays the personalized templates for selection by the user A, and the user A may select a personalized template as an incoming call show of the user A. Optionally, the user A may alternatively make the incoming call show by selecting from a local picture album of the mobile phone A, downloading from the Internet, or using a multimedia processing tool. Personalized information that is used for the incoming call show and that is of the user A is stored in the server and is managed by the server in an unified manner.

The mobile phone B may pull an incoming call show of a contact user of the user B from the server according to a predetermined frequency. If the user A is the contact user of the user B, in this case, when the user A establishes a call with the user B, the mobile phone B may display the incoming call show of the user A on a call interface of the two users. Optionally, when the user A calls the user B, the mobile phone B may pull the incoming call show of the user A from the server in real time, and display the incoming call show of the user A on the call interface of the user A and the user B.

In the information processing method in this embodiment of the present disclosure, the server performs security authentication on the first terminal according to the call setting request of the first terminal, and this process may ensure the security and reliability of call setting. Further, after the security authentication succeeds, the first user may set personalized information of the first user in the server by using the first terminal. The first user sets the personalized information reflecting an incoming call show, so that the personalized information of the first user may truly reflect an image, preference, habit, and/or the like of the first user. Furthermore, the server shares the personalized information of the first user with a second terminal establishing a call with the first terminal, so that the second terminal displays the personalized information of the first user on a call interface of the first terminal. Herein, the personalized information of the first user is managed and shared by using the server. This may enable another user to implement a function of an incoming call show without locally setting the incoming call show, thereby improving the efficiency of setting information and the practicality of processing information.

Figure 4:
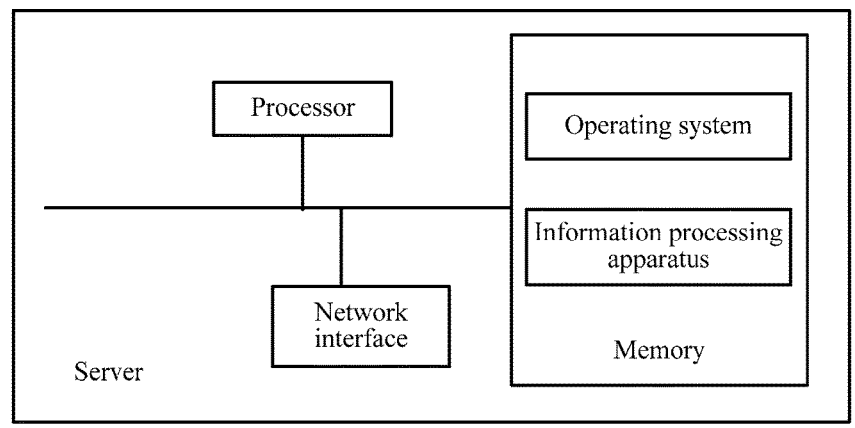
FIG. 4 is a schematic structural diagram of a server according to an embodiment of the present disclosure.

Based on the information processing system and the information processing method according to the foregoing embodiment, an embodiment of the present disclosure further provides a server. The server may be the server shown in FIG. 1 and may be configured to perform corresponding steps of the method process shown in FIG. 2 and FIG. 3. Referring to FIG. 4, an inner structure of the server may include, but is not limited to a processor, a network interface, and a memory. The processor, the network interface, and the memory of the server may be connected by using a bus or in another manner. In FIG. 4 in this embodiment of the present disclosure, a bus connection is used as an example.

Processing circuitry such as the processor (or referred to as a central processing unit (CPU) is a computing core and a control core of the server. Optionally, the network interface may include a standard wired interface and a standard wireless interface (such as Wi-Fi interface and a mobile communications interface). The memory is a memory device in the server and is configured to store programs and data. It can be understood that, the memory herein may be a high speed RAM memory or a non-volatile memory, for example, at least one magnetic disk memory. Optionally, the memory may further be at least one storage apparatus located away from the foregoing processor. The memory provides storage space. The storage space stores an operating system of the server, which may include, but is not limited to a Windows system (an operating system), a Linux (an operating system) system, and the like. This is not limited in the present disclosure. The storage space of the memory further stores an information processing apparatus.

Figure 5:
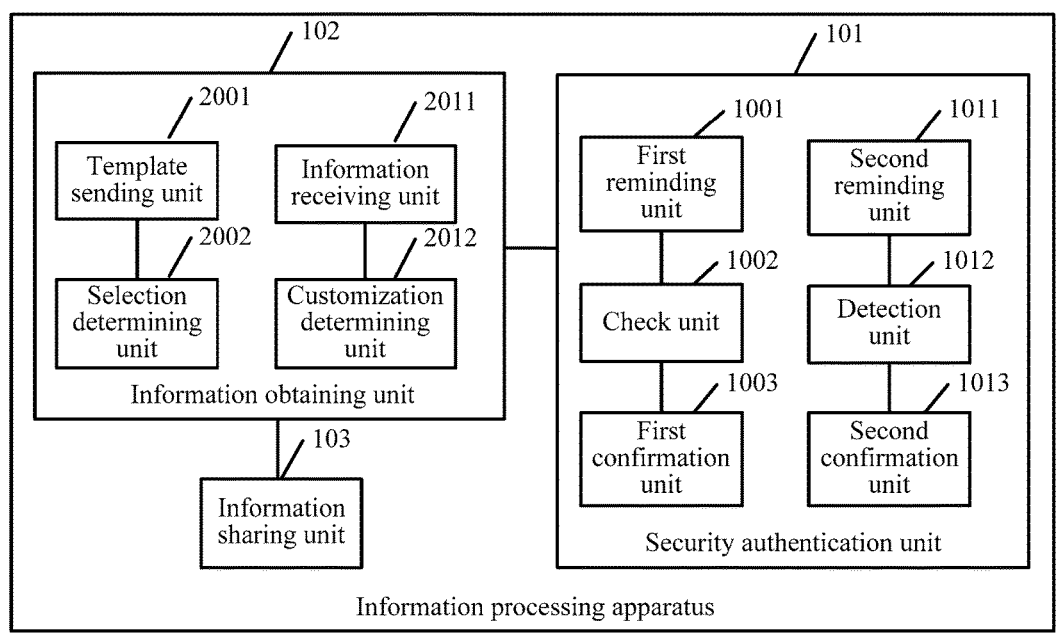
FIG. 5 is a schematic structural diagram of an information processing apparatus according to an embodiment of the present disclosure.

In this embodiment of the present disclosure, the server performs corresponding steps of the method process shown in FIG. 2 and FIG. 3 by running the information processing apparatus in the memory. Referring to FIG. 5, in a process of processing information, the information processing apparatus runs the following units:

a security authentication unit 101, configured to perform, if receiving a call setting request of a first terminal, security authentication on the first terminal;

an information obtaining unit 102, configured to obtain, if the security authentication succeeds, personalized information that is set by a first user by using the first terminal; and an information sharing unit 103, configured to share the personalized information of the first user with a second terminal establishing a call with the first terminal, so that the second terminal displays the personalized information of the first user on a call interface of the first terminal.

During one implementation, in a process of running the security authentication unit 101, the information processing apparatus runs the following units:

a first reminding unit 1001, configured to send, if receiving the call setting request of the first terminal, a first security authentication reminder to the first terminal, the first security authentication reminder carrying verification code;

a check unit 1002, configured to check, by the server when receiving a character string that is input by the first user according to the first security authentication reminder and that is returned by the first terminal, the input character string by using the verification code; and a first confirmation unit 1003, configured to confirm, if the check succeeds, that the security authentication performed on the first terminal succeeds.

During one implementation, in a process of running the security authentication unit 101, the information processing apparatus runs the following units:

a second reminding unit 1011, configured to send, if receiving the call setting request of the first terminal, a second security authentication reminder to the first terminal, the second security authentication reminder carrying a particular communication number;

a detection unit 1012, configured to detect whether verification information sent by the first terminal to the particular communication number is received in a preset time, the verification information being generated by the first terminal according to an information editing operation of the first user; and a second confirmation unit 1013, configured to confirm, if yes, that the security authentication performed on the first terminal succeeds.

During one implementation, in a process of running the information obtaining unit 102, the information processing apparatus runs the following units:

a template sending unit 2001, configured to send, if the security authentication succeeds, at least one personalized template to the first terminal for output to be provided to the first user for selection, the personalized template including: at least one of a picture, an animation, an audio, and a video; and a selection determining unit 2002, configured to determine a personalized template selected by the first user by using the first terminal as the personalized information of the first user.

During one implementation, in a process of running the information obtaining unit 102, the information processing apparatus runs the following units:

an information receiving unit 2011, configured to receive, if the security authentication succeeds, customized information uploaded by the first user by using the first terminal, the customized information including: at least one of a picture, an animation, an audio, and a video; and a customization determining unit 2012, configured to determine the customized information as the personalized information of the first user.

According to an embodiment of the present disclosure, steps S102, S105, and S106 in the information processing method shown in FIG. 2 may be performed by the units of the information processing apparatus shown in FIG. 5. For example, steps S102, S105, and S106 shown in FIG. 2 may be respectively performed by the security authentication unit 101, the information obtaining unit 102, and the information sharing unit 103 shown in FIG. 5. Steps s11 to s13 may be respectively performed by the first reminding unit 1001, the check unit 1002, and the first confirmation unit 1003 shown in FIG. 5. Steps s21 to s23 may be respectively performed by the second reminding unit 1011, the detection unit 1012, and the second confirmation unit 1013 shown in FIG. 5. Steps s31 and s32 may be respectively performed by the template sending unit 2001 and the selection determining unit 2002 shown in FIG. 5. Steps s41 and s42 may be respectively performed by the information receiving unit 2011 and the customization determining unit 2012.

According to another embodiment of the present disclosure, the units of the information processing apparatus shown in FIG. 5 may be separately or wholly combined into one or several other units, or one (or more) of the units herein may further be divided into multiple units of smaller functions. In this way, same operations can be implemented, and implementation of the technical effects of this embodiment of the present disclosure is not affected. The foregoing units are divided based on logical functions. In application, a function of one unit may also be implemented by multiple units, or functions of multiple units are implemented by one unit. In another embodiment of the present disclosure, the information processing apparatus may also include another unit. During practical application, these functions may also be cooperatively implemented by another unit and may be cooperatively implemented by multiple units.

According to another embodiment of the present disclosure, a computer program that can perform steps S102, S105, and S106 in the information processing method shown in FIG. 2 may be run on a general computing device, for example, a computer, that includes a processing element and a storage element such as a central processing unit (CPU), a random access memory (RAM), and a read-only memory (ROM), to construct the information processing apparatus shown in FIG. 5, and to implement the information processing method according to this embodiment of the present disclosure. The computer program may be recorded in, for example, a computer-readable recording medium, and may be loaded into the foregoing computing device by using the computer-readable recording medium, and run in the computing device.

Similar to the method, in the embodiments of the present disclosure related to the server and the information processing apparatus in same, security authentication may be performed on the first terminal according to the call setting request of the first terminal, and this process may ensure the security and reliability of call setting. Further, after the security authentication succeeds, the first user may set personalized information of the first user in the server by using the first terminal. The first user sets the personalized information reflecting an incoming call show, so that the personalized information of the first user may truly reflect an image, preference, habit, and/or the like of the first user. Furthermore, the server shares the personalized information of the first user with a second terminal establishing a call with the first terminal, so that the second terminal displays the personalized information of the first user on a call interface of the first terminal. Herein, the personalized information of the first user is managed and shared by using the server. This may enable another user to implement a function of an incoming call show without locally setting the incoming call show, thereby improving the efficiency of setting information and the practicality of processing information.

Figure 6:
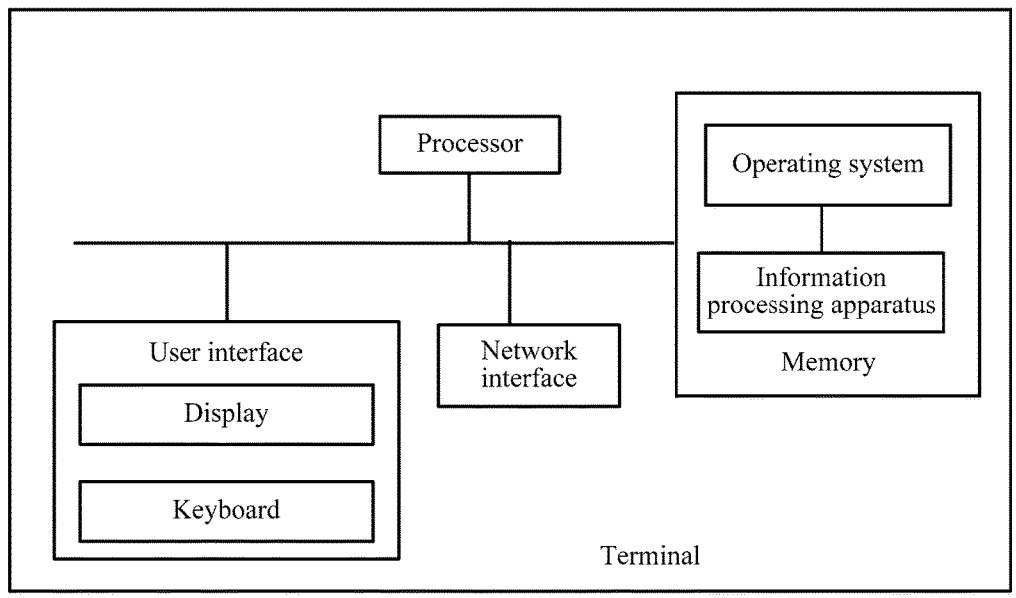
FIG. 6 is a schematic structural diagram of a terminal according to an embodiment of the present disclosure.

Based on the information processing system and the information processing method according to the foregoing embodiments, an embodiment of the present disclosure further provides a terminal. The terminal may be any terminal in the system shown in FIG. 1 and may perform corresponding steps of the method process shown in FIG. 2 and FIG. 3. Referring to FIG. 6, an inner structure of the terminal may include, but is not limited to a processor, a user interface, a network interface, and a memory. The processor, the user interface, the network interface, and the memory of the terminal may be connected by using a bus or in another manner. In FIG. 6 in this embodiment of the present disclosure, a bus connection is used as an example.

The user interface is a medium that implements interaction and information exchanging between a user and the terminal. A reflection of the user interface may include a display configured to output and a keyboard configured to input, and the like. It should be noted that, the keyboard herein may be an entity keyboard, a touchscreen virtual keyboard, or a keyboard in combination with entity and touchscreen virtuality. The processor (or referred to as a central processing unit (CPU)) is a computing core and control core of the terminal. The processor can parse various instructions in the terminal and process various data of the terminal. The memory is a memory device in the terminal and is configured to store programs and data. It can be understood that the memory herein may include an internal memory of the terminal, or may certainly include an extended memory supported by the terminal. The memory provides storage space. The storage space stores an operating system of the terminal, which may include, but is not limited to a Windows system (an operating system), an Android (a mobile operating system) system, an IOS (a mobile operating system) system, and the like. This is not limited in the present disclosure. The storage space of the memory stores the information processing apparatus. The information processing apparatus may be an application program run in the terminal.

Figure 7:
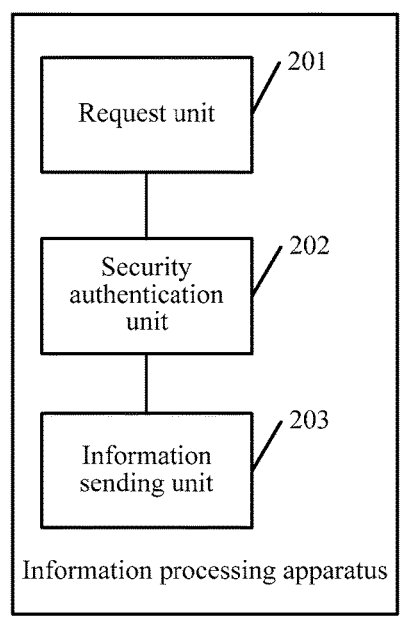
FIG. 7 is a schematic structural diagram of another information processing apparatus according to an embodiment of the present disclosure.

In an embodiment of the present disclosure, the first terminal may be any terminal accessed to the server, and the first user is a user (including a human user or an enterprise user) using the first terminal. The first terminal may perform the corresponding steps in the method process shown in FIG. 2 and FIG. 3 by running the information processing apparatus in the memory. Referring to FIG. 7 together, the information processing apparatus runs the following units.

A request unit 201 is configured to send, when detecting a call setting operation of a first user, a call setting request to a server.

During one implementation, the request unit 201 is configured to send, when detecting that the first user selects a call setting function option in an application program of the first terminal, the call setting request to the server; or configured to send, when detecting that the first user opens a call setting page in a browser of the first terminal, the call setting request to the server.

A security authentication unit 202 is configured to accept security authentication performed by the server.

An information sending unit 203 is configured to send, if the security authentication succeeds, personalized information that is set by the first user to the server, so that the server shares the personalized information of the first user with a second terminal establishing a call with the first terminal, and the second terminal displays the personalized information of the first user on a call interface of the first terminal.

According to an embodiment of the present disclosure, steps S101, S103, and S104 in the information processing method shown in FIG. 2 may be performed by the units of the information processing apparatus shown in FIG. 7. For example, steps S101, S103, and S104 shown in FIG. 2 may be respectively performed by the request unit 201, the security authentication unit 202, and the information sending unit 203 shown in FIG. 7.

According to another embodiment of the present disclosure, the units of the information processing apparatus shown in FIG. 7 may be separately or wholly combined into one or several other units, or one (or more) of the units herein may further be divided into multiple units of smaller functions. In this way, same operations can be implemented, and implementation of the technical effects of this embodiment of the present disclosure is not affected. The foregoing units are divided based on logical functions. In application, a function of one unit may also be implemented by multiple units, or functions of multiple units are implemented by one unit. In another embodiment of the present disclosure, the information processing apparatus may also include another unit. During practical application, these functions may also be cooperatively implemented by another unit and may be cooperatively implemented by multiple units.

According to another embodiment of the present disclosure, a computer program that can perform steps S101, S103, and S104 in the information processing method shown in FIG. 2 may be run on a general computing device, for example, a computer, that includes a processing element and a storage element such as a central processing unit (CPU), a random access memory (RAM), and a read-only memory (ROM), to construct the information processing apparatus device shown in FIG. 7, and to implement the information processing method according to the embodiments of the present disclosure. The computer program may be recorded in, for example, a computer-readable recording medium, and may be loaded into the foregoing computing device by using the computer-readable recording medium, and run in the computing device.

Figure 8:
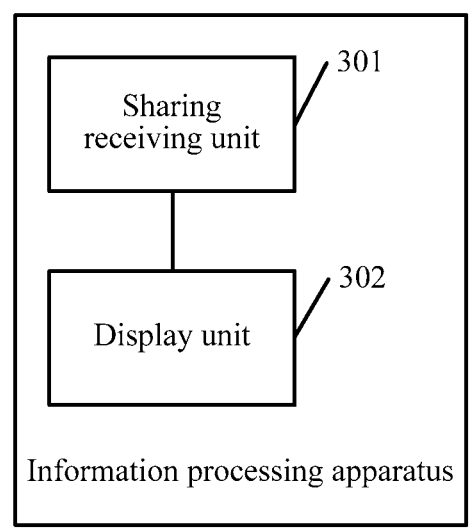
FIG. 8 is a schematic structural diagram of still another information processing apparatus according to an embodiment of the present disclosure.

In another embodiment of the present disclosure, the second terminal may be any terminal accessed to the server apart from the first terminal, and the second user is a user using the second terminal. The second terminal may perform the corresponding steps in the method process shown in FIG. 2 and FIG. 3 by running the information processing apparatus in the memory. Referring to FIG. 8 together, the information processing apparatus runs the following units.

A sharing receiving unit 301 is configured to receive personalized information of the first user shared by the server, the personalized information of the first user being information that is obtained after the server performs, after receiving a call setting request of the first terminal, security authentication on the first terminal and the security authentication succeeds, and that is set by the first user by using the first terminal.

During one implementation, the sharing receiving unit 301 is configured to pull personalized information of at least one contact user of a second user from the server according to a predetermined frequency, the contact user including the first user; or configured to obtain the personalized information of the first user from the server when the first terminal establishes a call with the second terminal according to a call request for the second user initiated by the first user.

A display unit 302 is configured to display the personalized information of the first user on a call interface of the first terminal.

According to an embodiment of the present disclosure, steps S107 and S108 in the information processing method shown in FIG. 2 may be performed by the units of the information processing apparatus shown in FIG. 8. For example, steps S107 and S108 shown in FIG. 2 may be respectively performed by the sharing receiving unit 301 and the display unit 302 shown in FIG. 8.

According to another embodiment of the present disclosure, the units of the information processing apparatus shown in FIG. 8 may be separately or wholly combined into one or several other units, or one (or more) of the units herein may further be divided into multiple units of smaller functions. In this way, same operations can be implemented, and implementation of the technical effects of this embodiment of the present disclosure is not affected. The foregoing units are divided based on logical functions. In application, a function of one unit may also be implemented by multiple units, or functions of multiple units are implemented by one unit. In another embodiment of the present disclosure, the information processing apparatus may also include another unit. During practical application, these functions may also be cooperatively implemented by another unit and may be cooperatively implemented by multiple units.

According to another embodiment of the present disclosure, a computer program that can perform steps S107 and S108 in the information processing method shown in FIG. 2 may be run on a general computing device, for example, a computer, that includes a processing element and a storage element such as a central processing unit (CPU), a random access memory (RAM), and a read-only memory (ROM), to construct the information processing apparatus device shown in FIG. 8, and to implement the information processing method according to this embodiment of the present disclosure. The computer program may be recorded in, for example, a computer-readable recording medium, and may be loaded into the foregoing computing device by using the computer-readable recording medium, and run in the computing device.

Similar to the method, in the embodiments of the present disclosure related to the terminal and the information processing apparatus, the server performs security authentication on the first terminal according to the call setting request of the first terminal, and this process may ensure the security and reliability of call setting. Further, after the security authentication succeeds, the first user may set personalized information of the first user in the server by using the first terminal. The first user sets the personalized information reflecting an incoming call show, so that the personalized information of the first user may truly reflect an image, preference, habit, and/or the like of the first user. Furthermore, the server shares the personalized information of the first user with a second terminal establishing a call with the first terminal, so that the second terminal displays the personalized information of the first user on a call interface of the first terminal. Herein, the personalized information of the first user is managed and shared by using the server. This may enable another user to implement a function of an incoming call show without locally setting the incoming call show, thereby improving the efficiency of setting information and the practicality of processing information.

In the description of this specification, if descriptions of the reference terms "an embodiment", "some embodiments", "an example", "a specific example", "some examples", or the like exist, it means that a specific feature, structure, material, or characteristic described with reference to the embodiment or example is included in at least one embodiment or example of the present disclosure. In this specification, the schematic representation of the foregoing terms does not necessarily refer to a same embodiment or example. Furthermore, the specific feature, structure, material, or characteristic described may be combined in an appropriate manner in any one or more embodiments or examples. In addition, in a case of no contradiction, a person skilled in the art may combine the different embodiments or examples with the features of the different embodiments or examples described in this specification.

In addition, the terms "first" and "second" are merely used for the objective of description and cannot be understood as indicating or implying relative importance or implicitly specifying an indicated number of technical features. Therefore, the feature limiting "first" and "second" may clearly show or implicitly include at least one of the features. In the description of the present disclosure, the meaning of "multiple" is at least two, for example, two or three, unless otherwise explicitly and specifically defined.

Any process or method description described in the flowchart or by using another manner herein may be understood as representing modules, segments, or parts of code that include one or more executable instructions for implementing the steps of a particular logical function or process. In addition, the scope of the implementations of the present disclosure includes additional implementations, where the functions may not be performed in an order shown or discussed, including a substantially simultaneous manner or in a reverse order according to the functions involved, which should be understood by a person skilled in the art to which the embodiments of the present disclosure belongs.

It should be understood that, various parts of the present disclosure may be implemented by using hardware, software, firmware, or a combination thereof. In the foregoing implementations, multiple steps or methods may be implemented by the software or firmware that is stored in the memory and that is executed by an appropriate instruction execution system. For example, if implemented by the hardware, as in another implementation, the steps or methods may be implemented by using any one or a combination of the following technologies well known in the art: a discrete logic circuit having a logic gate circuit for implementing a logic function on a data signal, an application-specific integrated circuit having an appropriate combinational logic gate circuit, a programmable gate array (PGA), field programmable gate array (FPGA), and the like. In addition, functional units according to the embodiments of the present disclosure may be integrated in one processing module or exist as separate physical units, or two or more units are integrated in one module. The integrated module may be implemented in a form of hardware, or may be implemented in a form of software functional module. If implemented in the form of software functional modules and sold or used as an independent product, the integrated module may also be stored in a computer-readable storage medium.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may be a magnetic disk, an optical disc, a read-only memory (ROM), a random access memory (RAM), or the like.

What is disclosed above is merely an exemplary embodiment of the present disclosure, and certainly is not intended to limit the protection scope of the present disclosure. Therefore, equivalent variations made according to the claims of the present disclosure shall fall within the scope of the present disclosure.

What is claimed is:

1. An information processing method, comprising:
   performing, by a server when receiving a call setting request of a first terminal, security authentication on the first terminal;
   when the security authentication on the first terminal succeeds,
   sending, by the server, at least one personalized template to the first terminal, and
   determining one of the at least one personalized template as personalized information of a first user when the one of the at least one personalized template is selected by the first user via the first terminal, the one of the at least one personalized template includes at least one of a picture, an animation, an audio, or a video; and
   providing, by the server, the personalized information of the first user to a second terminal for display during a call with the first terminal, wherein
   the provided personalized information of the first user is displayed on a call interface of the second terminal.

2. The information processing method according to claim 1, wherein the performing, by the server when receiving the call setting request of the first terminal, the security authentication on the first terminal comprises:
   sending, by the server when receiving the call setting request of the first terminal, a first security authentication reminder to the first terminal, the first security authentication reminder including a verification code;
   checking, by the server when receiving a character string that is input by the first user according to the first security authentication reminder from the first terminal, the input character string based on the verification code; and
   confirming, by the server when the checking succeeds, that the security authentication performed on the first terminal succeeds.

3. The information processing method according to claim 1, wherein the performing, by the server when receiving the call setting request of the first terminal, the security authentication on the first terminal comprises:
   sending, by the server when receiving the call setting request of the first terminal, a second security authentication reminder to the first terminal, the second security authentication reminder including a particular communication number;
   determining, by the server, whether verification information sent by the first terminal to the particular communication number is received within a preset time, the verification information being generated by the first terminal according to an information editing operation of the first user; and confirming, by the server when the verification information is determined to be received within the preset time, that the security authentication performed on the first terminal succeeds.

4. The information processing method according to claim 1, further comprising:
when the security authentication on the first terminal succeeds,
receiving, by the server, customized information uploaded by the first user via the first terminal, the customized information including at least one of a picture, an animation, an audio, or a video; and
determining, by the server, the customized information as the personalized information of the first user.

5. The information processing method according to claim 1, wherein the providing, by the server, the personalized information of the first user to the second terminal for display during the call with the first terminal comprises:
providing, by the server, the personalized information of the first user to the second terminal that establishes the call with the first terminal.

6. The information processing method according to claim 1, wherein the personalized information includes an image that is selected by the first user via the first terminal.

7. A non-transitory computer-readable storage medium storing a program executable by a processor of a first terminal to perform:
sending, when detecting a call setting operation of a first user, a call setting request to a server;
responding to a security authentication request from the server; and
when the security authentication succeeds,
receiving at least one personalized template from the server,
when one of the at least one personalized template is selected by the first user, sending the selection of the one of the at least one personalized template to the server, the one of the at least one personalized template being determined as personalized information of the first user, wherein
the one of the at least one personalized template includes at least one of a picture, an animation, an audio, or a video, and
the personalized information of the first user is provided by the server to a second terminal for display during a call with the first terminal, and
the personalized information of the first user is displayed on a call interface of the second terminal.

8. The non-transitory computer-readable storage medium according to claim 7, wherein the sending, when detecting the call setting operation of the first user, the call setting request to the server comprises:
sending, when detecting that the first user selects a call setting function option in an application program of the first terminal, the call setting request to the server.

9. The non-transitory computer-readable storage medium according to claim 7, wherein the sending, when detecting the call setting operation of the first user, the call setting request to the server comprises:
sending, when detecting that the first user opens a call setting page in a browser of the first terminal, the call setting request to the server.

10. A non-transitory computer-readable storage medium storing a program executable by a processor of a second tellinal to perform:
receiving personalized information of a first user from a server, the personalized information of the first user being determined as one of at least one personalized template sent to a first terminal when the one of the at least one personalized template is selected by the first user via the first terminal and obtained by the server after security authentication on the first terminal succeeds, the one of the at least one personalized template includes at least one of a picture, an animation, an audio, or a video; and
displaying the personalized information of the first user on a call interface of the second terminal.

11. The non-transitory computer-readable storage medium according to claim 10, wherein the receiving the personalized information of the first user from the server comprises:
obtaining personalized information of at least one contact user of a second user from the server according to a predetermined frequency, the at least one contact user including the first user.

12. The non-transitory computer-readable storage medium according to claim 10, wherein the receiving the personalized information of the first user from the server comprises:
obtaining the personalized information of the first user from the server when a call is established between the first terminal and the second terminal according to a call request.

13. An information processing apparatus, comprising:
processing circuitry configured to
perform, when receiving a call setting request of a first terminal, security authentication on the first terminal;
obtain, when the security authentication on the first terminal succeeds,
send at least one personalized template to the first terminal, and
determine one of the at least one personalized template as personalized information of a first user when the one of the at least one personalized template is selected by the first user via the first terminal, the one of the at least one personalized template includes at least one of a picture, an animation, an audio, or a video; and
provide the personalized information of the first user to a second terminal for display during a call with the first terminal, wherein
the provided personalized information of the first user is displayed on a call interface of the second terminal.

14. The information processing apparatus according to claim 13, wherein the processing circuitry is configured to
send, when receiving the call setting request of the first terminal, a first security authentication reminder to the first terminal, the first security authentication reminder including a verification code;
check, when receiving a character string that is input by the first user according to the first security authentication reminder from the first terminal, the input character string based on the verification code; and
confirm, when the check succeeds, that the security authentication performed on the first terminal succeeds.

15. The information processing apparatus according to claim 13, wherein the processing circuitry is configured to
send, when receiving the call setting request of the first terminal, a second security authentication reminder to the first terminal, the second security authentication reminder including a particular communication number;
determine whether verification information sent by the first terminal to the particular communication number is received within a preset time, the verification information being generated by the first terminal according to an information editing operation of the first user; and confirm, when the verification information is determined to be received within the preset time, that the security authentication performed on the first terminal succeeds.

16. The information processing apparatus according to claim 13, wherein the processing circuitry is configured to when the security authentication succeeds, receive customized information uploaded by the first user via the first terminal, the customized information including at least one of a picture, an animation, an audio, or a video; and determine the customized information as the personalized information of the first user.

17. The information processing apparatus according to claim 13, wherein the processing circuitry is configured to provide the personalized information of the first user to the second terminal that establishes the call with the first terminal.

18. The information processing apparatus according to claim 13, wherein the personalized information includes an image that is selected by the first user via the first terminal.

* * * * *